(12) United States Patent
Guha et al.

(10) Patent No.: US 10,337,129 B2
(45) Date of Patent: Jul. 2, 2019

(54) PROCESS OF DEBUNDLING CARBON FIBER TOW AND MOLDING COMPOSITIONS CONTAINING SUCH FIBERS

(71) Applicant: CONTINENTAL STRUCTURAL PLASTICS, INC., Auburn Hills, MI (US)

(72) Inventors: Probir Kumar Guha, Troy, MI (US); Michael J. Siwajek, Rochester Hills, MI (US); Michael J. Hiltunen, Rochester, MI (US); Shane Skop, Auburn Hills, MI (US); Christopher Hiltunen, Auburn Hills, MI (US); Patrick Hale, Auburn Hills, MI (US)

(73) Assignee: Continental Structural Plastics, Inc., Auburn Hills, MI (US)

( * ) Notice: Subject to any disclaimer, the term of this patent is extended or adjusted under 35 U.S.C. 154(b) by 345 days.

(21) Appl. No.: 14/398,673

(22) PCT Filed: May 1, 2013

(86) PCT No.: PCT/US2013/039041
§ 371 (c)(1),
(2) Date: Nov. 3, 2014

(87) PCT Pub. No.: WO2013/166132
PCT Pub. Date: Nov. 7, 2013

(65) Prior Publication Data
US 2015/0147543 A1 May 28, 2015

Related U.S. Application Data

(60) Provisional application No. 61/641,136, filed on May 1, 2012.

(51) Int. Cl.
| | | |
|---|---|---|
| D02J 1/18 | (2006.01) |
| C08J 5/24 | (2006.01) |
| B29C 70/08 | (2006.01) |
| B29B 15/08 | (2006.01) |
| B32B 9/04 | (2006.01) |
| B32B 17/00 | (2006.01) |
| B32B 17/06 | (2006.01) |
| D01G 1/04 | (2006.01) |
| B65H 51/005 | (2006.01) |
| B32B 5/26 | (2006.01) |
| B29K 307/04 | (2006.01) |

(52) U.S. Cl.
CPC ............ D02J 1/18 (2013.01); B29B 15/08 (2013.01); B29C 70/08 (2013.01); B32B 5/26 (2013.01); B32B 9/047 (2013.01); B32B 17/00 (2013.01); B32B 17/067 (2013.01); B65H 51/005 (2013.01); C08J 5/24 (2013.01); D01G 1/04 (2013.01); B29K 2307/04 (2013.01); B32B 2250/02 (2013.01); B32B 2262/10 (2013.01); B32B 2262/101 (2013.01); B32B 2262/106 (2013.01); B65H 2701/314 (2013.01); C08J 2300/00 (2013.01); Y10T 29/49801 (2015.01); Y10T 83/041 (2015.04); Y10T 83/0405 (2015.04); Y10T 83/0443 (2015.04); Y10T 428/2495 (2015.01)

(58) Field of Classification Search
CPC ............... B29B 15/08; Y10T 29/49801; Y10T 428/2495; Y10T 83/0405; Y10T 83/041; Y10T 83/0443
USPC ........................................................ 428/212
See application file for complete search history.

(56) References Cited

U.S. PATENT DOCUMENTS

| | | |
|---|---|---|
| 3,795,944 A | 3/1974 | Daniels |
| 5,001,172 A | 3/1991 | Tsuchiya et al. |
| 5,030,435 A | 7/1991 | Kitamura et al. |
| 5,108,458 A | 4/1992 | Marumoto et al. |
| 5,510,185 A | 4/1996 | Fujisawa et al. |
| 5,525,180 A | 6/1996 | Paul, Jr. et al. |
| 5,721,047 A | 2/1998 | Thicthener et al. |

(Continued)

FOREIGN PATENT DOCUMENTS

| | | |
|---|---|---|
| CN | 102504492 A | 6/2012 |
| EP | 0881312 A2 | 12/1998 |

(Continued)

OTHER PUBLICATIONS

Extended European Search Report dated May 26, 2017 for European Application No. 17154012 filed May 1, 2013.

*Primary Examiner* — Lawrence D Ferguson
(74) *Attorney, Agent, or Firm* — Avery N. Goldstein; Blue Filament Law PLLC

(57) ABSTRACT

A process for debundling a carbon fiber tow into dispersed chopped carbon fibers suitable for usage in molding composition formulations is provided. A carbon fiber tow is fed into a die having fluid flow openings, through which a fluid impinges upon the side of the tow to expand the tow cross sectional area. The expanded cross sectional area tow extends from the die into the path of a conventional fiber chopping apparatus to form chopped carbon fibers, or through contacting tines of a mechanical debundler. Through adjustment of the relative position of fluid flow openings relative to a die bore through which fiber tow passes, the nature of the fluid impinging on the tow, the shape of the bore, in combinations thereof, an improved chopped carbon fiber dispersion is achieved. The chopped carbon fiber obtained is then available to be dispersed in molding composition formulations prior to formulation cure.

17 Claims, 3 Drawing Sheets

(56) References Cited

U.S. PATENT DOCUMENTS

| | | | |
|---|---|---|---|
| 6,066,395 A | 5/2000 | Miyoshi et al. | |
| 6,253,431 B1 | 7/2001 | Ames et al. | |
| 6,315,004 B1 | 11/2001 | Wellman et al. | |
| 6,444,187 B1 | 9/2002 | Miyoshi et al. | |
| 6,729,676 B1 | 5/2004 | O'Hara et al. | |
| 7,655,297 B2 | 2/2010 | Guha et al. | |
| 7,691,223 B2 | 4/2010 | Dahl et al. | |
| 7,820,290 B2 | 10/2010 | Murai et al. | |
| 7,968,024 B2 | 6/2011 | Williams et al. | |
| 8,196,631 B2 | 6/2012 | Dahl et al. | |
| 2003/0124314 A1* | 7/2003 | Michael | B32B 3/28 428/156 |
| 2004/0018350 A1 | 1/2004 | Hilligoss | |
| 2005/0228108 A1* | 10/2005 | Raghavendran | D04H 13/008 524/494 |
| 2007/0132126 A1* | 6/2007 | Shao | C04B 35/522 264/29.1 |
| 2007/0298236 A1 | 12/2007 | Simmons et al. | |
| 2010/0126412 A1 | 5/2010 | Dahl et al. | |
| 2014/0199551 A1 | 7/2014 | Lewit | |

FOREIGN PATENT DOCUMENTS

| | | |
|---|---|---|
| EP | 2196497 A1 | 6/2010 |
| GB | 1454394 A | 11/1976 |
| JP | 56048256 A | 5/1981 |
| JP | 61157335 A | 7/1986 |
| JP | H08311713 A | 11/1996 |
| JP | 08323924 A | 12/1996 |
| JP | 2003268674 A | 9/2003 |
| JP | 2004084133 A | 3/2004 |
| JP | 2004190201 A | 7/2004 |
| JP | 2005155971 A | 6/2005 |
| JP | 2008254191 A | 10/2008 |
| KR | 100302243 B1 | 6/2002 |
| KR | 1020070107015 A | 11/2007 |
| WO | 2011111559 A1 | 9/2011 |

* cited by examiner

PROCESS OF DEBUNDLING CARBON FIBER TOW AND MOLDING COMPOSITIONS CONTAINING SUCH FIBERS

CROSS-REFERENCE TO RELATED APPLICATION

This application claims priority of U.S. Provisional Patent Application Ser. No. 61/641,136 filed May 1, 2012, which is incorporated herein by reference.

FIELD OF THE INVENTION

The present invention in general relates to a process for debundling carbon fiber tow and in particular, to a process for producing chopped and disbursed carbon fibers amenable to inclusion molding compositions.

BACKGROUND OF THE INVENTION

The use of fiber inclusions to strengthen a matrix is well known to the art. Well established mechanisms for the strengthening include slowing and elongating the path of crack propagation through the matrix, as well as energy distribution associated with pulling a fiber free from the surrounding matrix material. In the context of sheet molding composition (SMC) formulations and bulk molding composition (BMC) formulations; hereafter referred to collectively as "molding compositions", fiber strengthening has traditionally involved usage of chopped glass fibers. There is a growing appreciation in the field of molding compositions that replacing in part, or all of the glass fiber in molding compositions with carbon fiber. However, this effort has met with limited success owing to differences between glass and carbon fibers. Specifically, these differences include fiber diameter with glass fibers used in molding compositions having typical diameters of between 16 and 30 microns while carbon fibers typically have diameters of between 2 and 10 microns. Additionally, whereas glass roving fabrics, or bundles typically have tens to hundreds of individual fibers, carbon fiber tows typically come in bundles of thousands and even tens of thousands of individual fibers. A still further difference exists in the fiber-fiber interactions where glass fibers tend to scatter and debundle upon chopping, Van der waals bonding and other interfiber surface interactions tend to make carbon fiber disinclined from debundling after chopping into desired lengths for use as reinforcement in a molding composition. While the debundling of carbon fiber tows is addressed in laboratory scale moldings through manual manipulation, problems exist for production scale debundling of carbon fiber tow into separate chopped carbon fibers.

Thus, there exists a need for a process to debundle carbon fiber tow into separated chopped carbon fibers in a continuous manner. There further exists a need to facilitate interaction of carbon fibers with molding composition components to enhance the strength of a resulting SMC or BMC.

SUMMARY OF THE INVENTION

An improved device and method for debundling a large number of carbon fibers collectively forming a tow into dispersed chopped carbon fibers suitable for usage in molding composition formulations is provided. According to an embodiment of the present invention, a carbon fiber tow is fed into a die having fluid flow openings, through which a fluid impinges upon the side of the tow to expand the tow cross sectional area. The expanded cross sectional area tow extends from the die into the path of a conventional fiber chopping apparatus to form chopped carbon fibers. Through adjustment of the relative position of fluid flow openings relative to a die bore through which fiber tow passes, the nature of the fluid impinging on the tow, the shape of the bore, in combinations thereof, an improved chopped carbon fiber dispersion is achieved, compared to existing processes. The chopped carbon fiber obtained according to the present invention is then available in certain embodiments to be dispersed in molding composition formulations prior to formulation cure. Through control of the molding composition monomer polarity, still further dispersion and anisotropy of the chopped carbon fibers is obtained.

A mechanical debundler that accepts tow like material, such as carbon fiber tow, as input in a top feed area between two opposing rollers with tines, where the first roller spins clockwise and the second roller spins counter clockwise so as to pull the tow inward towards a lower tined roller that rotates faster than the upper two rollers, and as the tow goes through it gets pulled open and kinked to expand the tow to about 5 times in height. In embodiments, the mechanical debundler may also be used simultaneously with heating, air blowing, or plasma. In the embodiment where plasma is used, the tines are charged to create plasma in region that tow is being teased open.

In an alternative embodiment of the present invention, a conventionally chopped fiber tow is dispersed in a polar monomer containing molding composition.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

The present invention has utility in debundling a large number of carbon fibers collectively forming a tow into dispersed chopped carbon fibers suitable for usage in molding composition formulations. According to the present invention, a carbon fiber tow is fed into a die having fluid flow openings, through which a fluid impinges upon the side of the tow to expand the tow cross sectional area. The expanded cross sectional area tow extends from the die into the path of a conventional fiber chopping apparatus to form chopped carbon fibers. Through adjustment of the relative position of fluid flow openings relative to a die bore through which fiber tow passes, the nature of the fluid impinging on the tow, the shape of the bore, in combinations thereof, an improved chopped carbon fiber dispersion is achieved, compared to existing processes. The chopped carbon fiber obtained according to the present invention is then available in certain embodiments to be dispersed in molding composition formulations prior to formulation cure. Through control of the molding composition monomer polarity, still further dispersion and anisotropy of the chopped carbon fibers is obtained.

In an alternative embodiment of the present invention, a conventionally chopped fiber tow is dispersed in a polar monomer containing molding composition.

Figure 1A:
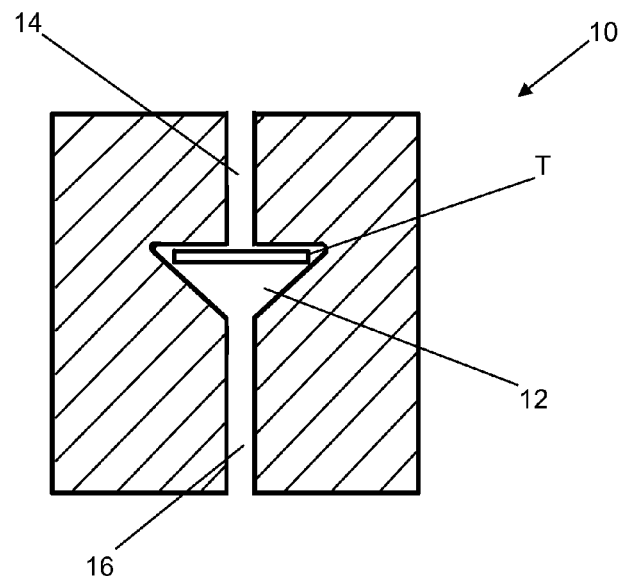
FIG. 1A is a transverse cross sectional view of a die according to the present invention operative in debundling carbon fiber tow.
Figure 1B:
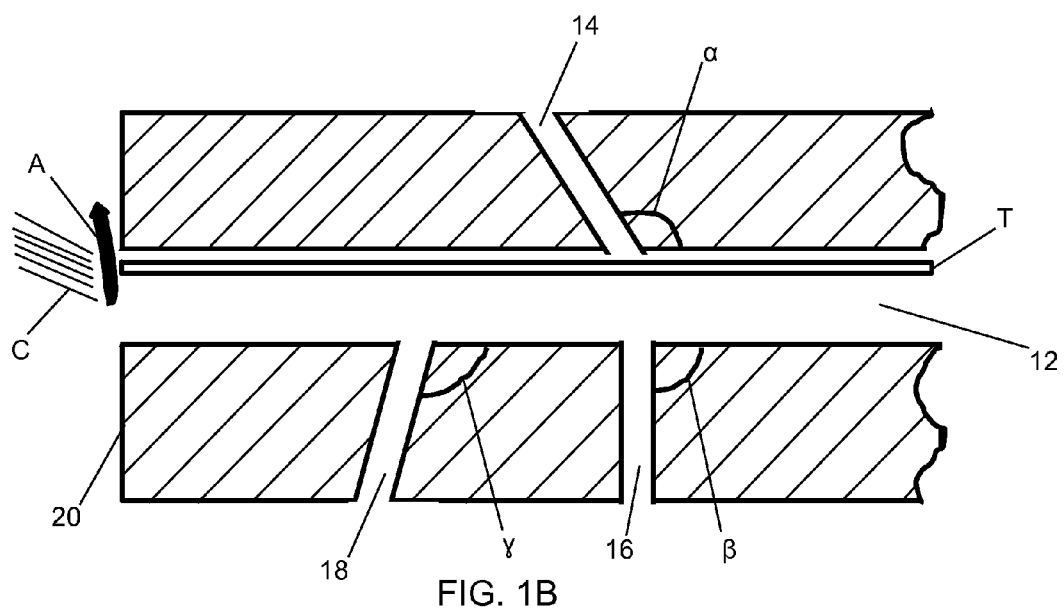
FIG. 1B is a longitudinal cross sectional view of the die shown in FIG. 1A.

Referring now to FIGS. 1A and 1B, an inventive die is shown generally at 10. The die 10 has a bore 12 that is dimensionally larger than the cross sectional area of the carbon fiber tow T passed there through. At least two fluid flow openings 14, 16, and 18 as shown in FIGS. 1A and 1B are provided to allow fluid communication into the bore 12 and onto the side of the carbon fiber tow T. The bore 12 is depicted having a triangular cross section. It is appreciated that the bore of an inventive die has other cross sectional shapes such as circular, oval, hourglass-shape, and other polygonal cross sectional shapes. The fluid openings 14, 16, and 18 allow for a fluid to be injected into the bore 12 so as to impact the side of the carbon fiber tow T and induce debundling so as to increase the cross sectional area of the bundle T. According to the present invention at least two fluid openings are provided. It is appreciated that the fluid ingress need only occur through the fluid openings as the fluid is able to leave the die 10 from the terminal die face 20 that is proximal to a fiber chopping apparatus A. Through the control of feed rate of the tow T and the operational speed of the chopper A, a controlled length debundled chopped fiber C is obtained.

As fluid impingement the fluid openings 14, 16, and 18 each intersect with the bore 12 at an angle, alpha ($\alpha$), beta ($\beta$), and gamma ($\gamma$), respectively. Each of these angles is independently variable. In specific embodiments, the angles alpha, beta, and gamma are each independently between 30 and 150 degrees, although it should be appreciated that other angles are operative herein.

Without intending to be bound to a particular theory, it is believed that, the fluid enters the bore 12 under conditions such that the fluid penetrates into the tow T creating a larger void volume in the resultant expanded cross sectional area bundle. Fluid entering the bore 12 that as an expanding fluid tends to travel along a path of least resistance, the conditions are preferably established that favor fluid penetration through the tow T thereby increasing the cross section of the tow T prior to the fluid exiting through a lower pressure fluid flow opening than the one through which the fluid entered alone or in combination with exiting through the terminal die face 20. As best shown in FIG. 1B, it should be appreciated that fluid flow openings need not all exist in a single plane where fluid flow outlet 18 is downstream from openings 14 and 16 relative to the movement of the tow T.

Figure 2:
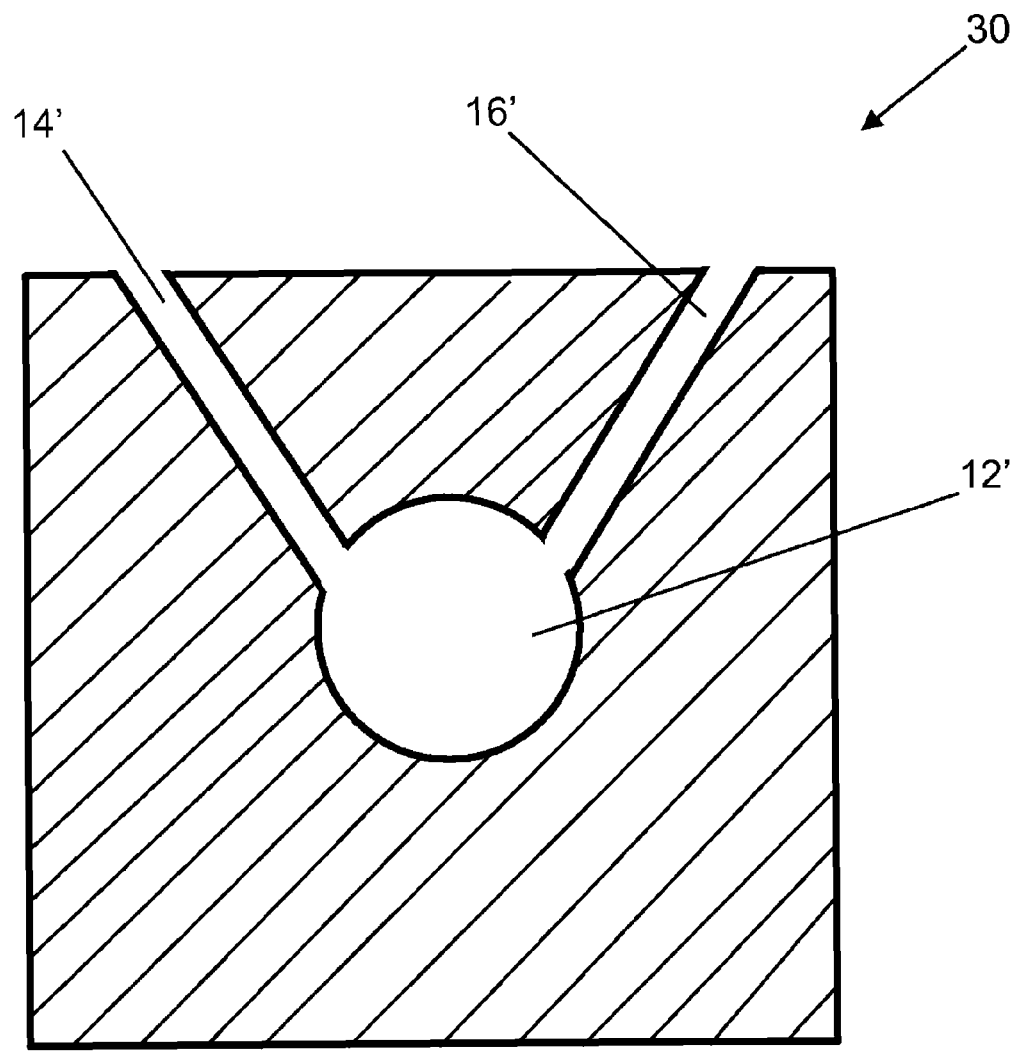
FIG. 2 is a second embodiment of a die operative in the present invention for debundling carbon fiber tow.

Another embodiment of an inventive die is shown in FIG. 2 generally at 30 with a circular bore 12' and fluid openings 14' and 16';

As used herein, the term "fluid" is intended to include gasses, liquids, and aerosol atomized fluids. Fluids operative herein for debundling carbon fiber tow illustratively include air, nitrogen, noble gasses, carbon dioxide, carbon monoxide, and steam. It is appreciated that organic molecules, and silanes, above the respective boiling temperature of each are also operative herein as gaseous fluids used to debundle carbon fiber filaments. Liquid fluids suitable for debundling carbon fiber tow illustratively include high polarity liquids with a relative polarity of greater than about 0.5. In addition to a simple fluid, a fluid according to the present invention also carries an additive such as particulate, radicals, coupling agents, and combinations thereof. Particulate suitable for entrainment within a fluid impinging upon a carbon fiber tow illustratively include carbon black, calcium carbonate, colloidal silica, titanium dioxide, and combinations thereof. Coupling agents operative herein illustratively include epoxies, organo-titanates, organo-zirconates, hydroxyl methyl resorcinol, and combinations thereof. Radicals operative as additive; especially gaseous fluids illustratively include ozone, singlet oxygen, and plasma. It is appreciated that control of factors such as cross sectional area of the bore, the shape of the bore, inlet pressure of fluid, and relative position of fluid exit openings affect the degree of carbon fiber tow debundling, to produce dispersed carbon fiber strands after being chopped from the tow by a chopping apparatus A is readily achieved.

As shown in FIG. 2 where like numerals correspond to the meanings ascribed thereto with respect to FIGS. 1A and 1B, another die as part of an inventive process is provided. Without intending to be bound to a particular theory, simultaneously impinging upon a carbon fiber tow from two fluid flow openings as shown in FIG. 2, under conditions that limit the twisting of the carbon fiber tow is suitable in inventive embodiments for successful debundling.

Figure 3:
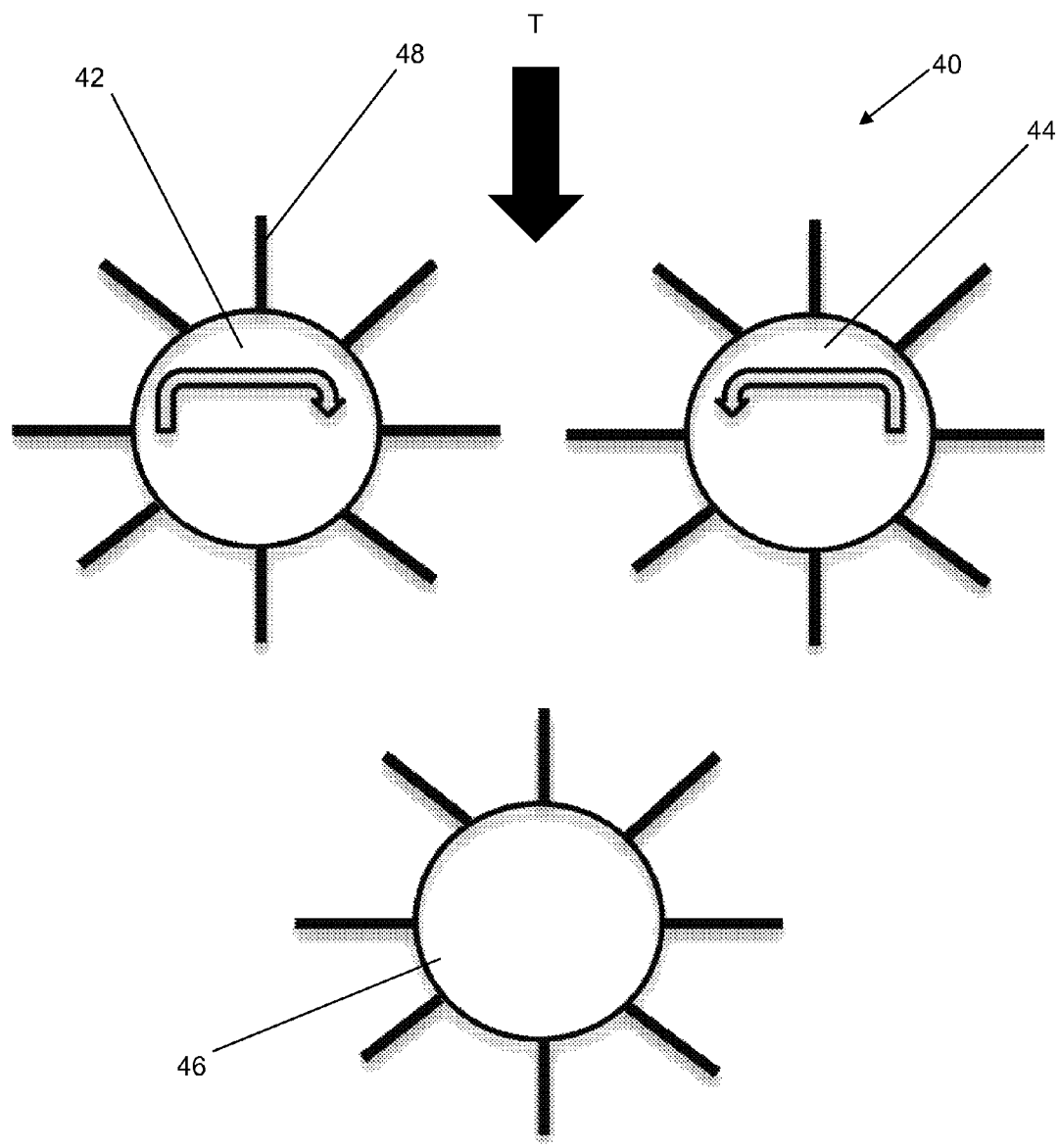
FIG. 3 illustrates a mechanical debundler according to an embodiment of the invention.

FIG. 3 illustrates an inventive mechanical debundler 40 that accepts tow like material, such as carbon fiber tow, as input in a top feed area between two opposing rollers with tines 48, where the first roller 42 spins clockwise and the second roller 44 spins counter clockwise so as to pull the tow inward towards a lower tined roller 46 that rotates faster than the upper two rollers (42, 44), and as the tow goes through it gets pulled open and kinked to expand the tow to about 5 times in height. In embodiments, the mechanical debundler may also be used simultaneously with heating, air blowing, or plasma to separate the tow. In certain embodiments, heat is applied that is sufficient to remove any sizing or other conventional surface coatings on the surface of the carbon fibers. In still other embodiments heat is applied under an inert or reducing atmosphere to promote pyrolysis of the sizing from the core carbon fibers. A plasma is readily generated with a conventional plasma generator source to treat the tow fibers prior to, during, or subsequent to engagement with the second roller 44. In the embodiment where plasma is used, the tines are charged to create plasma in the region that the tow is being teased open. It is appreciated that a tow is contacted with a mechanical debundler in concert with air debundling or as a stand alone process.

An inventive process after a carbon fiber tow has been fed through a die with impingement of fluid onto the side of the tow and penetrating the carbon fiber tow so as to increase the cross sectional area, or through the mechanical debundler, the tow is then chopped into preselected lengths of carbon fiber strands. The resultant strands are then dispersed in an SMC, BMC or RTM formulation for subsequent molding and cure. It has been found that such chopped fiber strands tend to disperse and achieve a greater degree of both fiber debundling and anisotropy when the molding composition is more polar. In specific embodiments of the present invention, the chopped carbon fibers so produced are dispersed in a methyl methacrylate monomer. Other suitable monomers from which a molding composition formulation is produced illustratively include unsaturated polyesters, epoxies, and combinations thereof. A molding composition formulation based on epoxy illustratively includes bis-phenol-A and Novolac based epoxy terminated resins. Suitable curing agents for such an epoxy based molding composition formulation illustratively include anhydrides such as trimellitic anhydride, methyl tetrahydrophthalic anhydride (MTHPA), nadic methyl anhydride (NMA), di- and tri-functional amines, and combinations thereof.

An alternative embodiment of the present invention involves dispersing conventional chopped and bundled carbon tow in a molding composition monomer or solution containing monomer with a relative polarity of greater than 0.26, and in certain embodiments greater than 0.5, and in still other embodiments between 0.5 and 0.8. Relative polarity is defined per Christian Recihardt, Solvents and Solvent Effects in Organic Chemistry, Wiley-VCH, $3^{rd}$ edition, 2003.

The chopped carbon fibers produced according to an inventive process are readily dispersed in molding composition formulations prior to cure as a substitute for, or in combination with glass fibers. As a result of debundling carbon fiber tow according to an inventive process, a reinforced SMC, BMC or resin transfer molding (RTM) cured article is formed that has a lower density overall, and a lower percentage by weight loading of fibers. Additionally, through the use of coupling agents superior tensile strength is achieved. Additionally, it is of note that the inventive process as a continuous process for producing chopped carbon fibers is amenable to usage with production scale manufacture.

The resulting chopped and debundled carbon fibers find particular utility in an SMC having an inner portion containing from 10 to 40% by weight carbon fibers of the inner portion, with an outer skin of SMC based on the commercially available TCA (Continental Structural Plastics) containing glass fiber containing between 10 and 60% glass fiber by weight of the TCA portion, as embodied in U.S. Pat. No. 7,655,297. The ratio of thickness of the inner portion to the outer skin ranges from 01-10:1. The resulting SMC inner portion and outer skin layers are either cured separately and joined or cured in contact with one another. Such a dual layer SMC with an inner portion containing carbon fibers is noted to have a density that is 10, 20, 30 and even 40% lower than the comparable article formed wholly from TCA. In this way a lightweight article is formed that retains the high surface glass of a class-A surface associated with TCA.

Patent documents and publications mentioned in the specification are indicative of the levels of those skilled in the art to which the invention pertains. These documents and publications are incorporated herein by reference to the same extent as if each individual document or publication was specifically and individually incorporated herein by reference. The foregoing description is illustrative of particular embodiments of the invention, but is not meant to be a limitation upon the practice thereof. The following claims, including all equivalents thereof, are intended to define the scope of the invention.

The invention claimed is:

1. An article comprising:
    an inner layer of cured sheet molding composition having an inner layer thickness and comprising a thermoset resin matrix reinforced predominantly with dispersed, chopped carbon fibers;
    an outer skin of a second cured sheet molding composition having an outer skin thickness and comprising a thermoset resin matrix reinforced predominantly with chopped glass fibers, wherein said outer skin is devoid of chopped carbon fiber, and wherein the outer skin is in contact with and joined to the inner layer; and
    a ratio of the inner layer thickness to outer skin thickness between 0.1-10:1.

2. The article of claim 1 wherein said inner layer is devoid of glass fiber.

3. The article of claim 1 wherein said outer skin has an automotive surface quality finish.

4. The article of claim 1 wherein said outer skin has a class-A finish.

5. The article of claim 1 wherein the dispersed, chopped carbon fibers are debundled carbon tow fibers.

6. The article of claim 1 wherein the inner layer contains from 10% to 40% by weight carbon fibers of the inner layer.

7. The article of claim 1 wherein the inner layer and the outer skin are cured separately and joined together.

8. The article of claim 1 wherein the article has a density that is 10% to 40% lower than a comparable article formed without the carbon fiber reinforced inner layer.

9. An article consisting of:
    an inner layer of cured sheet molding composition comprising a thermoset resin matrix reinforced predominantly with dispersed, chopped carbon fibers; and
    an outer skin of a second cured sheet molding composition comprising a thermoset resin matrix reinforced predominantly with chopped glass fibers, wherein said outer skin is devoid of chopped carbon fiber, and wherein the outer skin is in contact with and joined to the inner layer.

10. The article of claim 9 wherein said inner layer is devoid of glass fiber.

11. The article of claim 9 wherein said outer skin has an automotive surface quality finish.

12. The article of claim 9 wherein said outer skin has a class-A finish.

13. The article of claim 9 wherein said inner layer has an inner layer thickness and said outer skin has an outer skin thickness and the ratio of the inner layer thickness to outer skin thickness is between 0.1-10:1.

14. The article of claim 9 wherein the dispersed, chopped carbon fibers are debundled carbon tow fibers.

15. The article of claim 9 wherein the inner layer contains from 10% to 40% by weight carbon fibers of the inner layer.

16. The article of claim 9 wherein the inner layer and the outer skin are cured separately and joined together.

17. The article of claim 9 wherein the article has a density that is 10% to 40% lower than a comparable article formed without the carbon fiber reinforced inner layer.

* * * * *